US005357085A

United States Patent [19]
Sturman, Jr.

[11] Patent Number: 5,357,085
[45] Date of Patent: Oct. 18, 1994

[54] INDUCTION HEATING OF POLYMER MATRIX COMPOSITE FIBER STRANDS

[75] Inventor: Philip C. Sturman, Jr., Rexford, N.Y.

[73] Assignee: General Electric Company, Schenectady, N.Y.

[21] Appl. No.: 160,706

[22] Filed: Nov. 29, 1993

[51] Int. Cl.$^5$ .............................................. H05B 6/10
[52] U.S. Cl. .................... 219/636; 219/647; 219/657; 219/651; 219/674
[58] Field of Search .............. 219/10.61 R, 10.51, 219/10.79, 10.67, 10.69, 10.57, 636, 645, 651, 649, 653, 654, 676, 672, 674, 647, 657

[56] References Cited

U.S. PATENT DOCUMENTS

| | | | |
|---|---|---|---|
| 919,366 | 4/1909 | Lemp | 219/10.51 |
| 1,671,839 | 5/1928 | Owen | 219/10.51 |
| 3,521,018 | 7/1970 | Boerger et al. | 219/651 |
| 3,860,737 | 1/1975 | Moscatello | 219/651 |
| 4,321,446 | 3/1982 | Ogawa et al. | 219/645 |
| 4,350,861 | 9/1982 | Pouillange et al. | 219/645 |
| 4,563,145 | 1/1986 | de Meij | 425/174.8 R |
| 4,678,883 | 7/1987 | Saitoh et al. | 219/645 |

OTHER PUBLICATIONS

Miller et al., "The Nature of Induction Heating in Graphite-Fiber, Polymer-Matrix Composite Materials", SAMPE Journal, vol. 26, No. 4, Jul./Aug. 1990, pp. 37–54.

Williams et al., "Induction Welding of Thermoplastic Composites," IMechE, C400/034, 1990, pp. 133–136.

Border, "the Heat's On For Quick Composite Repair," Machine Design, Mar. 7, 1991, pp. 71–74.

*Primary Examiner*—Philip H. Leung
*Attorney, Agent, or Firm*—Patrick R. Scanlon; Paul R. Webb, II

[57] ABSTRACT

Induction heating is utilized to heat polymer matrix composite fiber strands containing electrically conductive fibers. This is accomplished with an apparatus having a helical induction coil and a matching helical guide tube situated adjacent to the induction coil. Composite fiber strands are drawn through the guide tube which is made of a non-electrically conductive, nonmagnetic material. Electrically conductive rollers, positioned next to the entrance and exit of the guide tube, form an electrical circuit with the electrically conductive fibers. This permits currents to be induced in the fibers when the coil is activated, thereby heating the fiber composites. The guide tube can be thermally insulated and flushed with an inert purge gas. Alternatively, the guide tube can be made of an electrically conductive or ferromagnetic material so that heat producing currents are induced in the guide tube, and the composite fiber strands are heated by conduction. In this case, the fibers need not be electrically conductive.

10 Claims, 1 Drawing Sheet

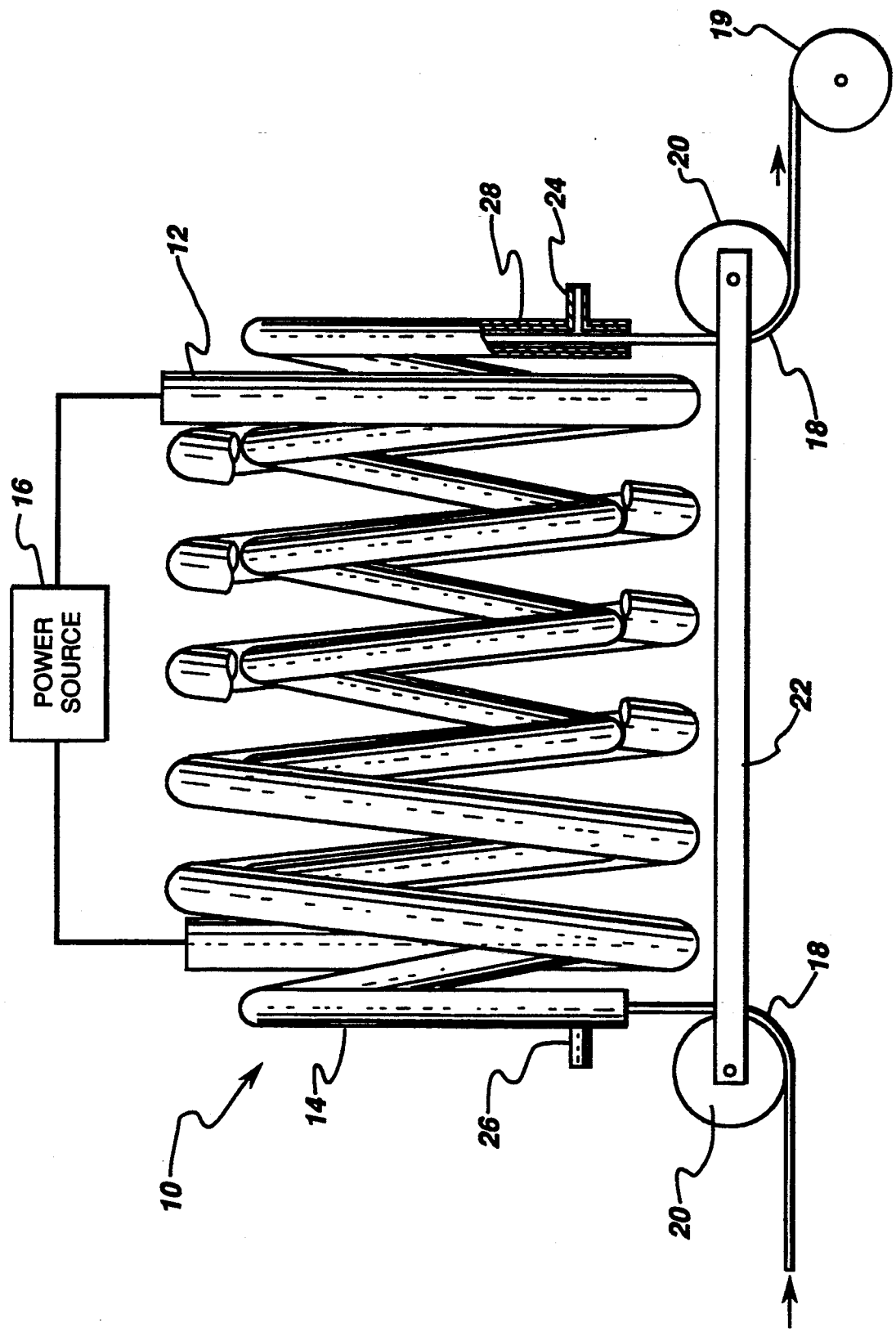

INDUCTION HEATING OF POLYMER MATRIX COMPOSITE FIBER STRANDS

CROSS REFERENCE TO RELATED APPLICATIONS

This application is related to copending applications entitled "Induction Heating of Polymer Matrix Composites in a Mold Press," Ser. No. 08/160,712 and "Induction Heating of Polymer Matrix Composites in an Autoclave," Ser. No. 08/160,713, both filed concurrently herewith and assigned to the same assignee as the present invention.

BACKGROUND OF THE INVENTION

This invention relates generally to heating polymer matrix composites and more particularly to induction heating of polymer matrix composite fiber strands having electrically conductive fibers for the purpose of partially curing the composite fiber strands.

A composite material combines two or more other materials into a single, integrated structure in a manner that the combined materials maintain their original identities. Polymer matrix composites comprise high-strength fibers embedded in a polymeric matrix. The matrix holds the fibers in the proper orientation and protects them from external damage. Polymeric matrix materials fall into two general classes, thermosetting and thermoplastic. The fibers can be configured in many different formats, depending on the intended application of the composite material. Known formats include chopped (molding compound), unidirectional sheet or tape, continuous strands (straight or braided), or woven cloth. Examples of materials typically used for the reinforcing fibers include carbon, graphite, boron and silicon carbide.

Polymer matrix composite fiber strands are often used in filament winding fabrication processes wherein the continuous fiber strands are wound over a rigid form or mandrel (which may or may not be subsequently removed) to form an assembly which is then cured. In some applications, the fiber composite strands are partially cured prior to the winding process. This preliminary curing is known as "staging." Conventional methods for staging composite fiber strands include heating spools of impregnated fibers in an oven and feeding impregnated fibers through a series of pulleys in a heated chamber. The former method results in materials with uneven physical properties, while the latter method requires a relatively large chamber with commensurate energy costs. Many composite materials require a low-oxygen curing environment; such an environment is expensive to provide with the conventional methods.

These conventional staging methods involve exposing the outer surfaces of the part to an external source of heat. Heat transport to the interior of the part occurs by conduction. This process requires that surface temperatures exceed interior temperatures for some or all of the production cycle. The rate of heating is dependent on this temperature gradient (i.e., the greater the temperature gradient, the faster the part will be fully heated). Since the polymeric matrix will be damaged if exposed to excessive temperature, the heating rate must be restrained (thus lengthening cycle time) so that no portion of the part exceeds the temperature limit.

In addition, some polymers undergo condensation-type chemical reactions during curing which produce volatile reactants. The higher exterior temperatures of conventional heating techniques tend to advance curing at the surface of the part, sometimes forming a hard, impermeable "skin" on the part surface which can trap the volatiles given off during the condensation-type reactions. Trapped volatiles usually result in excessive voids and delaminations, essentially rendering the finished part useless.

Induction heating is one approach which can avoid the above-mentioned disadvantages. Generally, induction heating occurs by exposing a workpiece to an oscillating magnetic field. They magnetic field is typically produced by passing an alternating current through a conducting coil situated near the workpiece. The applied field induces eddy currents in the workpiece, and the eddy currents generate heat by resistive effects. The induced eddy currents generally flow perpendicular to the applied magnetic field and tend to roughly mimic the coil current. Thus, to be susceptible to induction heating, the workpiece must be electrically conductive and be able to define electric paths which approximate the shape of the coil. Isotropic workpieces such as metallic plates easily meet these requirements even with spiral coils, but other workpieces are less susceptible to conventional induction heating. Polymer matrix composites containing electrically conductive fibers could conduct electric currents but the currents are essentially restricted to the fibers because of the high resistivity of the polymeric matrix material. Thus, the electrical conducting paths in such composites are limited.

Accordingly, there is a need for an apparatus and method for heating polymer matrix composite fiber strands by induction heating, thereby rapidly heating the composites without the large temperature gradients necessary with conventional conductive heating.

SUMMARY OF THE INVENTION

The above-mentioned needs are met by the present invention which utilizes induction heating to heat polymer matrix composites containing electrically conductive fibers. Specifically, the present invention provides an induction heating apparatus comprising a helical induction coil and a helical guide tube situated adjacent to the induction coil through which the workpiece is drawn. The guide tube is made of a non-electrically conductive, nonmagnetic material and shaped to substantially match the shape of the induction coil. A first and second rollers are positioned adjacent to the entrance and exit, respectively, of the guide tube and make contact with the workpiece. A rod is connected to the two rollers, and the rod and rollers are electrically conductive, thereby forming an electrical circuit with the fibers in the workpiece. This permits currents to be induced in the workpiece fibers when the coil is activated, thereby heating the workpiece. The guide tube is thermally insulated and has a gas inlet formed near a first end and a gas outlet formed near a second end which allow the guide to be flushed with an inert purge gas.

Alternatively, the guide tube can be made of an electrically conductive or ferromagnetic material so that heat producing currents are induced in the guide tube when the induction coil is activated. The workpiece is then heated by conduction of energy from the guide tube. In this case, the workpiece fibers need not be electrically conductive.

By using induction heating, the present invention is able reduce heating time without the large temperature gradients of conventional processes. Consequently, composite fiber strands can be quickly staged without excessive voids. The use of induction heating also produces short cycle times because only the workpiece (and not any supporting structure) is directly heated. Moreover, the present invention provides for rapid heating of composite parts without the need for artificial susceptors (e.g., metallic particles or screens). This is advantageous because besides the obvious weight penalty, such susceptors may compromise the mechanical properties and inspectability of the parts.

Other objects and advantages of the present invention will become apparent upon reading the following detailed description and the appended claims with reference to the accompany drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

The single FIGURE is a partially cutaway side view of the induction heating apparatus of the present invention.

DETAILED DESCRIPTION OF THE INVENTION

Referring to the FIGURE, an apparatus 10 for heating polymer matrix composite fiber strands having electrically conductive fibers is shown. The heating apparatus 10 includes an elongated helical induction coil 12 and a helical guide tube 14 positioned adjacent to the coil 12. The coil 12 is shown partially cutaway to better show the guide tube 14. The induction coil 12 is connected to an AC power source 16 capable of producing an alternating current in a frequency range suitable for induction heating. A polymer matrix composite workpiece 18 to be heated is drawn through the hollow guide tube 14 by a conventional winding apparatus or other such means (represented schematically at reference numeral 19). The workpiece 18 comprises a bundle of continuous, electrically conductive fibers embedded in a polymeric matrix. Suitable fiber materials include carbon (particularly amorphous carbon and graphite) and some metals.

The workpiece 18 is directed through the guide tube 14 by a pair of rollers or pulleys 20. One of the rollers 20 is located adjacent to the entrance of the guide tube 14, and the other is located adjacent to the guide tube exit. The rollers 20 are rotatively supported at opposing ends of a connector rod 22. Both of the rollers 20 are electrically conductive and thus capable of maintaining electrical contact with the entering and exiting portions of the of the workpiece fibers, respectively. The connecting rod 22 is also electrically conductive to provide an electrical circuit which permits induced current flow through the fibers.

The guide tube 14 is positioned relative to the induction coil 12 so as to,be entirely within the magnetic field generated by the coil 12. Preferably, the turns of the guide tube 14 conform to the turns of the coil 12, with a slightly smaller diameter so that the shape of the guide tube 14 substantially matches the shape of the coil 12. The guide tube 14 can be in direct contact with the coil 12, although this is not necessary as long as the guide tube 14 is within the coil's magnetic field. How close the guide tube 14 needs to be to the coil 12 is dependent on the strength of the magnetic field which, in turn, is dependent on the density of the turns of the coil 12. The tighter the coil 12 is wound, the stronger the magnetic field will be. Therefore, the guide tube 14 need not be in contact with the coil 12, if the coil 12 is wound tightly enough.

The coil 12 is an electrical conductor (e.g., copper) capable of carrying sufficiently large currents and may be made of hollow tubing so that a coolant such as water can be passed therethrough. The guide tube 14 is preferably made of a non-electrically conductive, non-magnetic material although a material of low electrical conductivity and ferromagnetic characteristics can be used. The interior surface of the guide tube 14 must also be smooth to facilitate passage of the workpiece 18 therethrough. Suitable materials for the guide tube 14 include ceramics and polymer resins having deformation temperatures exceeding process temperatures (which typically reach about 150°–250° C.). A gas inlet 24 is provided near or at the exit of the guide tube 14, and a gas outlet 26 is provided near or at the entrance of the guide tube 14. The guide tube 14 thus can be flushed with an inert purge gas during heating to prevent oxidation of the workpiece 18 and to remove any reaction byproducts.

The guide tube 14 is encased in thermal insulation 28 in order to insulate the heated workpiece 18 from the cooler external temperatures, thereby increasing the thermal efficiency of the apparatus 10. The thermal insulation 28 can be a layer of insulating materials or a larger tube which is evacuated to provide a thermal barrier. The workpiece 18 can be insulated without use of thermal insulation 28 when the guide tube 14 is made of a material having low electrical conductivity or ferromagnetic characteristics. In this case, activation of the coil 12 would heat the guide tube 14 to a moderate temperature. The controlled temperature of the guide tube 14 would prevent heat loss from the workpiece 18.

In operation, the workpiece 18 is drawn through the guide tube 14 by the winding apparatus 19. At the same time, the power source 16 is activated so as to deliver an alternating current to the induction coil 12 which in turn generates an oscillating magnetic field. The power source 16 operates at a frequency which is suitable for induction heating and complies with industry standards and regulations. The magnetic field generates eddy currents in the fibers of the workpiece 18. Because the rollers 20 and the connecting rod 22 complete an electrical circuit around the fibers, the induced currents are able to flow through the fibers, thereby heating the workpiece 18.

As an variation to the above-described embodiment, the guide tube 14 can be made of an electrically conducting or ferromagnetic material. In this variation, the guide tube 14 is directly heated by the induction coil 12, and the workpiece 18 is heated by conduction of energy from the guide rude 14. Accordingly, the fibers of the workpiece 18 need not be electrically conductive, and the rollers 20 and the connection rod 22 do not need to complete an electrical circuit. Furthermore, there is more leeway in the shape of the guide tube 14, particularly if a ferromagnetic material is used. That is, the guide tube 14 does not necessarily need to be helical.

The foregoing has described induction heating of polymer matrix composite fiber strands, particularly those containing electrically conductive fibers. While specific embodiments of the present invention have been described, it will be apparent to those skilled in the art that various modifications thereto can be made without departing from the spirit and scope of the invention as defined in the appended claims.

What is claimed is:

1. An apparatus for heating a polymer matrix composite workpiece, said apparatus comprising:
    a helical induction coil;
    a power source connected to said induction coil;
    a helical guide tube situated adjacent to said induction coil; and
    means for drawing a polymer matrix composite workpiece through said guide tube.

2. The apparatus of claim 1 further comprising a first roller positioned adjacent to a first end of said guide tube and in contact with said workpiece and a second roller positioned adjacent to a second end of said guide tube and in contact with said workpiece.

3. The apparatus of claim 2 further comprising a rod connected to said first roller and said second roller, said rod, said first roller and said second roller all being electrically conductive.

4. The apparatus of claim 1 further comprising a gas inlet formed near a first end of said guide tube and a gas outlet formed near a second end of said guide tube.

5. The apparatus of claim 1 wherein said guide tube is encased with thermal insulation.

6. The apparatus of claim 1 wherein said guide tube is made of a non-electrically conductive, nonmagnetic material.

7. The apparatus of claim 1 wherein said guide tube is made of a material having low electrical conductivity and ferromagnetic characteristics.

8. The apparatus off claim 1 wherein said guide tube is made of an electrically conducting material.

9. The apparatus of claim 1 wherein said guide tube is made of a ferromagnetic material.

10. A method of heating a polymer matrix composite workpiece, said method comprising the steps of:
    providing a helical guide tube next to a helical induction coil;
    drawing a polymer matrix composite workpiece through said guide tube; and
    simultaneously activating said induction coil.

* * * * *